Dec. 30, 1941.    L. M. BUSH    2,267,815
MACHINE FOR MAKING TUBULAR OBJECTS
Filed Feb. 2, 1940    2 Sheets-Sheet 1
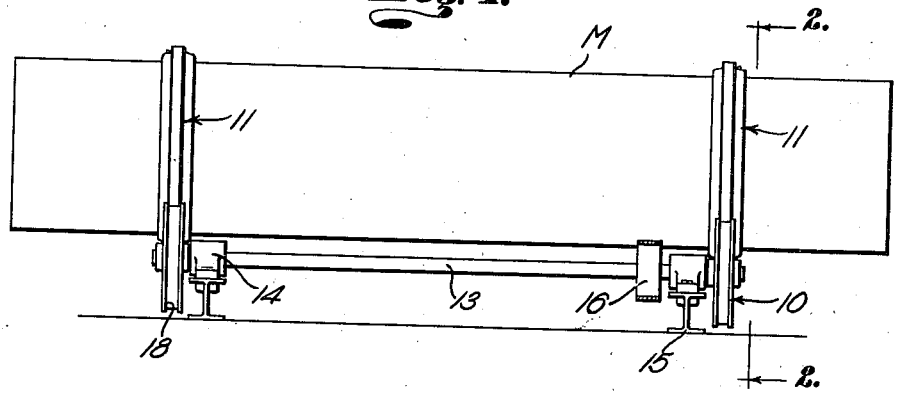
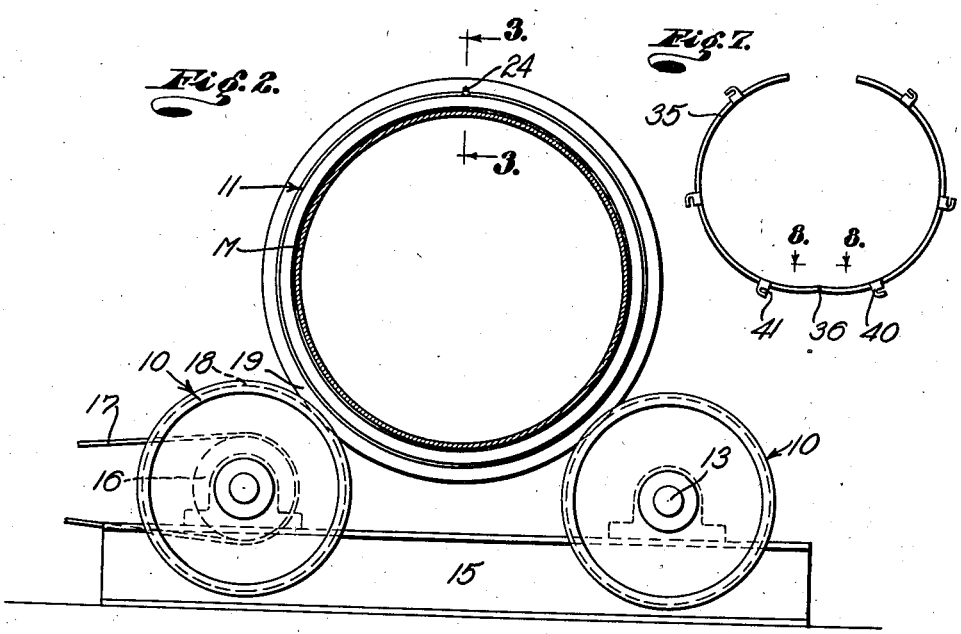
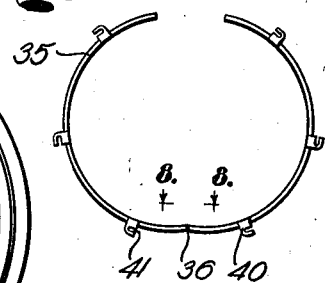
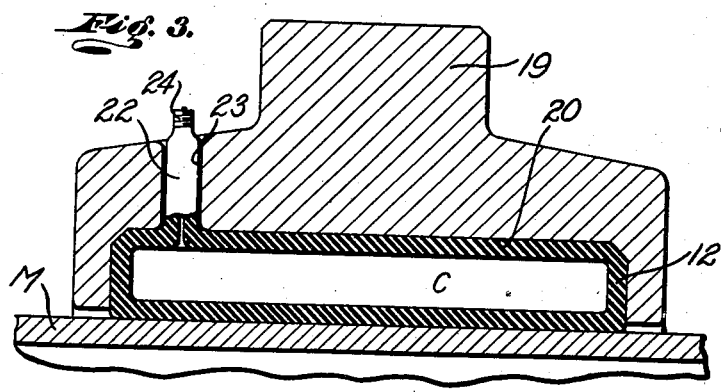
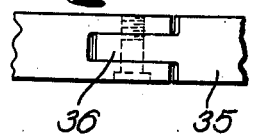
Inventor
LUTHER M. BUSH
By
His Attorney Dec. 30, 1941. L. M. BUSH 2,267,815
MACHINE FOR MAKING TUBULAR OBJECTS
Filed Feb. 2, 1940 2 Sheets-Sheet 2
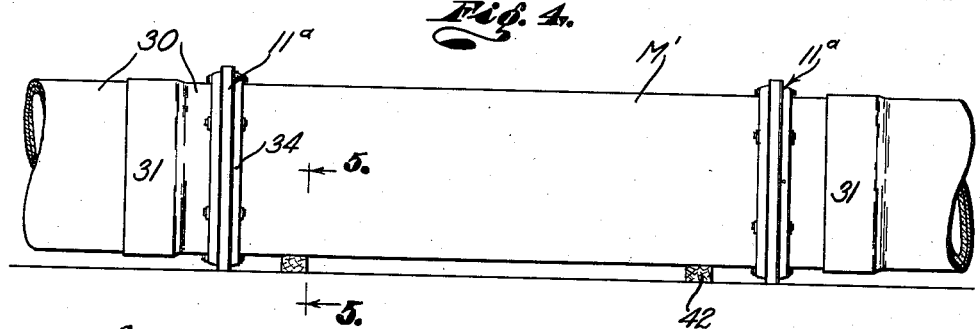
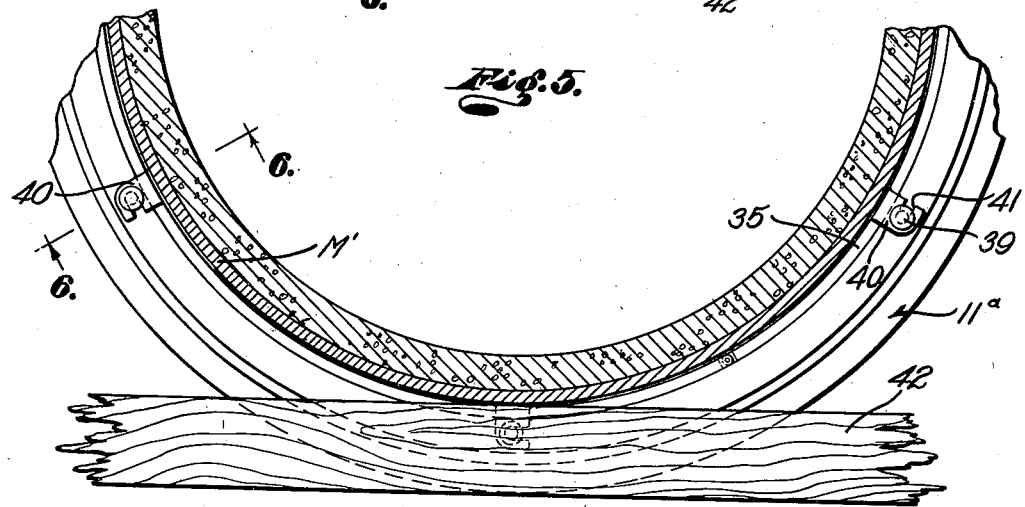
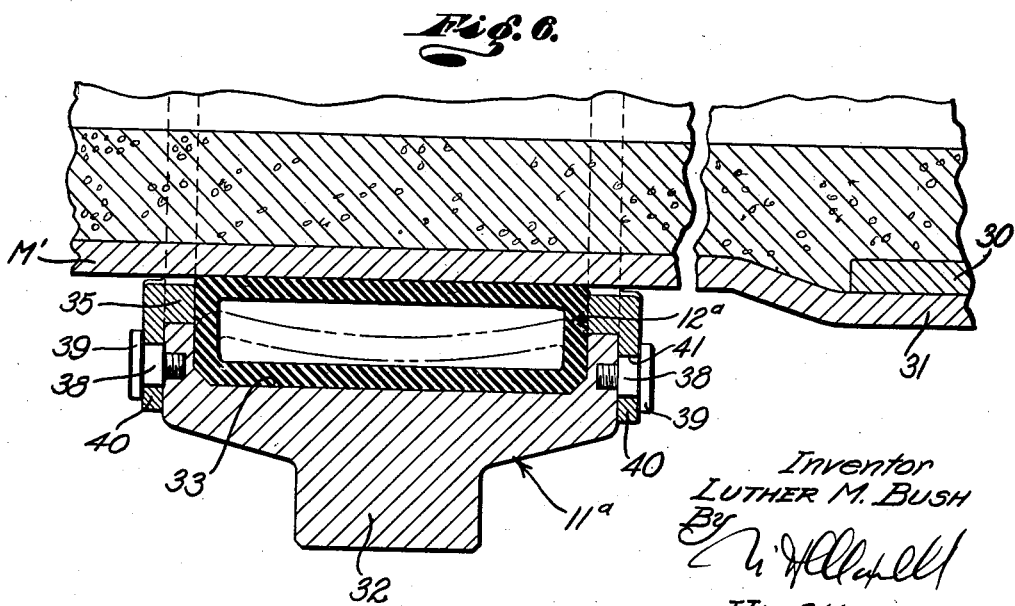
Inventor
LUTHER M. BUSH
By
His Attorney Patented Dec. 30, 1941

2,267,815

UNITED STATES PATENT OFFICE 2,267,815

MACHINE FOR MAKING TUBULAR OBJECTS

Luther M. Bush, Los Angeles, Calif.

Application February 2, 1940, Serial No. 316,954

6 Claims. (Cl. 25—30)

This invention relates to the manufacture of tubular objects, such as poles, pipe, etc., and relates more particularly to a machine for manufacturing such objects. A general object of the invention is to provide a simple, practical and improved machine for molding, casting and lining tubular objects by the rotary or centrifugal method.

In the manufacture of concrete poles, pipes, columns, etc., a tubular mold is employed and is supported for rotation by metal rollers. The mold supporting and driving rollers usually engage rings or trunnion wheels clamped about the mold. Considerable difficulty is encountered in maintaining the rotary mold structure balanced to rotate smoothly, particularly where reinforcements are to be embodied in the casting. Strains are often set up in the mold and casting by reason of the unbalanced condition of the rotating structure which stresses cause cracks to develop in the finished concrete product.

Another object of this invention is to provide a centrifugal casting machine for forming poles, pipe, etc., that is operable to form castings free of internal stresses and the cracks that result from such stresses.

Another object of this invention is to provide a machine of the character mentioned embodying a novel mold supporting and driving means that cushions all irregular motion of the mold that would otherwise tend to set up strains and cause vibration.

Another object of the invention is to provide a machine of the character referred to in which all vibration and irregular and undesirable motion of the rotating mold is eliminated without resorting to the employment of spring-loaded bearings, spring supports, or like complicated, expensive devices.

Another object of the invention is to provide a machine of the character referred to embodying trunnion wheels having pneumatic shock and vibration absorbing elements which engage about and grip the mold to cushion and absorb vibration that would otherwise be transmitted to the mold and to yield in a manner to compensate for irregularities and uneven weight distribution.

Another object of this invention is to provide a machine of the character referred to in which the pneumatic shock and vibration absorbing elements are in the nature of annular inflated tubes carried by the trunnion wheels and capable of tightly engaging about the mold to prevent direct metal to metal contact between the mold and trunnion wheels and to accurately center the mold for smooth even rotation.

Another object of this invention is to provide a machine of the character referred to in which the inflated tubes of the trunnion wheels may remain inflated at the termination of the centrifugal casting operation so that the mold may be rolled onto a drying rack by means of the trunnion wheels whereupon the pneumatic tubes may be deflated to allow the mold to rest on the rack and to permit the free easy removal of the trunnion wheels from the mold for use on other molds.

A further object of the invention is to provide a machine of the character referred to that is inexpensive to manufacture and that is easy and convenient to operate.

The various objects and features of my invention will be fully understood from the following detailed description of typical preferred forms and applications of the invention, throughout which description reference is made to the accompanying drawings, in which:

Fig. 1 is a side elevation of one embodiment of the invention. Fig. 2 is an enlarged end view of the machine shown in Fig. 1 illustrating the mold in cross section being a view taken as indicated by line 2—2 on Fig. 1. Fig. 3 is an enlarged fragmentary vertical detailed sectional view taken as indicated by line 3—3 on Fig. 2. Fig. 4 is a view similar to Fig. 1 illustrating trunnion wheels of another design engaged about a sectional mold which rests upon a drying rack. Fig. 5 is an enlarged fragmentary vertical detailed sectional view taken substantially as indicated by line 5—5 on Fig. 4. Fig. 6 is an enlarged fragmentary detailed sectional view taken as indicated by line 6—6 on Fig. 5. Fig. 7 is a side or end view of one of the retaining rings removed from its trunnion wheels and in an open condition and Fig. 8 is an enlarged fragmentary plan view of the hinge of the ring illustrated in Fig. 7, being a view taken as indicated by line 8—8 on Fig. 7.

In the following description I will refer to the machine of the invention as employed in the manufacture of tubular cementitious objects. The machine is adapted to other uses, for example, it may be employed to line, coat, or otherwise treat tubular and solid objects and may be used in the manufacture of objects other than cementitious objects. Accordingly, the invention is not to be considered as limited or restricted to the specific form or application of the invention herein described but is to be taken as including any features that may fall within the scope of the claims.

The molding machine of the present invention illustrated in Figs. 1, 2 and 3 of the drawings, may be said to comprise, generally, sets of supporting and driving rollers 10, rings or trunnion members 11 arranged about the mold M and supported on the sets of rollers 10, and pneumatic tubes 12 on the trunnion members 11 for engaging about the mold M.

There may be any desired or required number of sets of supporting and driving trunnion rollers 10. In the simple construction illustrated there are two spaced sets of rollers 10. Each set of rollers 10 comprises two rollers of like diameter. The rollers 10 are fixed to spaced parallel axles or shafts 13 supported by suitable bearings 14. The bearings 14 may be mounted on suitable supporting beams 15. It is preferred to drive at least one roller 10 of each set of rollers. In the construction illustrated a pulley 16 is fixed to the axle or shaft 13 of the rollers 10 at one side of the machine. The pulley 16 may be driven by a belt 17 which in turn may be operated by an electric motor, or the like (not shown). The rims or peripheries of the trunnion rollers 10 have continuous grooves 18 of generally rectangular cross section.

The trunnion members 11 are adapted to be arranged about the mold M at longitudinally spaced points to cooperate with the sets of supporting and driving rollers 10. There is one trunnion member 11 provided to cooperate with each set of rollers 10. The members 11 are in the nature of rings and in accordance with the invention may be simple, continuous, one-piece members. The members 11 are proportioned to surround the mold M with some clearance and to remain clear of the mold, as will be more fully described. The outer sides or peripheries of the members 11 have rims or flanges 19 of reduced axial extent for engaging or operating in the grooves 18 of the rollers 10. The engagement of the flanges 19 in the grooves 18 of course holds the members 11 and the mold M against endwise movement.

The trunnion members 11 are formed to receive and carry the pneumatic tubes 12. The interior or inner side of each member 11 is provided with a recess or groove 20. The grooves 20 are annular or continuous and are uniform in depth and width. In the preferred construction the grooves 20 are generally rectangular in cross sectional configuration and their corners may be rounded or beveled. The grooves 20 are preferably of substantial width and their width is preferably materially greater than their depth.

The pneumatic tubes 12 are important features of the invention. In accordance with the invention a tube 12 is carried by each trunnion member 11 and serves as a vibration absorbing mold gripping and chucking element. The tubes 12 are arranged in the grooves 20 and are annular to surround the mold M. The tubes 12 are in the nature of flexible resilient annular bags or envelopes each having an air chamber C. The tubes 12 may be constructed of rubber, rubber composition or synthetic rubber and may or may not be reinforced as desired. The cushioning and vibration absorbing tubes 12 are shaped to conform to the grooves 20, being generally rectangular in transverse cross section. It is to be understood that the grooves 20 and the tubes 12 may be of the selected or most desirable cross sectional shape. The air chambers C of the pneumatic tubes 12 are annular or continuous and the walls of the tubes 12 may be substantially uniform in thickness. Suitable means are provided to inflate and deflate the tubes 12. A tubular stem 22 is provided on each tube 12 and passes outwardly through an opening 23 in the surrounding member 11 to have its end exposed at the periphery of the wheel. Suitable tire valve fittings 24 may be provided on the stems 22 to provide for the introduction of air under pressure to the chambers C and to permit the easy deflation of the tubes 12. The mold M may be a continuous mold, a split mold or a sectional mold as conditions require.

In employing the machine of the invention illustrated in Figs. 1, 2 and 3 the members 11 carrying the tubes 12 are slipped over the mold M to the positions where they may cooperate with the trunnion rollers 10. The tubes 12 are deflated at this time to freely pass over the mold M. When the trunnion members 11 are in the correct positions air under pressure is introduced to the tubes 12 by means of the valve fittings 24. A pump or an air pressure line may be employed to supply the air under pressure for the tubes 12. The air under pressure admitted to the chambers C of the tubes 12 expands the tubes so that they tightly engage in the grooves 20 and tightly grip the mold M. The air pressure provided in the tube chambers C is preferably sufficient to cause the tubes 12 to tightly and dependably grip the mold M. The expanded tubes 12 centralize the trunnion members 11 on the mold M and space the internal surfaces of the members from the mold M, as best illustrated in Fig. 3. This, of course, keeps the members 11 out of direct metal to metal engagement with the mold M.

The cementitious material or concrete in a plastic state is introduced into the mold M and the mold is rotated by the driven trunnion rollers 11 to carry out the centrifugal molding action in the manner well known to those skilled in the art. The rotating mold M is supported by the trunnion members 11 through the medium of the inflated tubes 12. The tubes 12 act as cushions to absorb or eliminate vibration and are yieldable to compensate for unbalanced conditions that might otherwise result in irregular rotation of the mold M. The resilient, inflated tubes 12 assure the smooth, even rotation of the mold M and, therefore, assure an even distribution of the cementitious material in the mold. Further, it is to be observed that the inflated tubes 12 uniformly grip the mold M throughout its circumference so that the mold and the cementitious casting are not subjected to unbalanced strains and forces. The tubes 12 serve to secure the trunnion members 11 to the mold M in a manner far superior to the securing means heretofore employed which of necessity put spaced and unbalanced gripping forces on the mold M. The mold M being supported for rotation through the medium of the inflated tubes 12 carried in the members 11 may, if desired, be rotated at a greater speed than is customary with little or no vibration to produce a perfect casting or cementitious object.

At the completion of the centrifugal casting operation the mold M may be removed from the sets of rollers 10 and rolled across the floor or yard on the members 11. The mold M may be rolled over a suitable rack to permit the drying and seasoning of the casting. The rack (not shown) may be such that the members 11 are clear of the floor when the mold is supported on the rack. The air under pressure in the tubes 12 may then be exhausted or discharged by means of the valved fittings 24. The tubes 12 may be deflated by the natural discharge of the air under pressure, or in the case of heavy thick-walled tubes 12 it may be desirable to deflate them with the aid of a vacuum or suction line or pump. When the tubes 12 are deflated their resiliency frees them from the mold M so that the wheels 11 carrying the tubes 12 may be easily slid from the mold and upon deflation of the tubes 12 the mold M lowers onto the rack.

Figs. 4 to 8, inclusive, illustrate a form of trunnion member and pneumatic tube assembly that may be employed to adapt the machine to handle a sectional mold M' having swedged or externally upset sections 30. Each section 30 of the mold M' has a plain end of uniform diameter and an upset end portion 31 of enlarged diameter for receiving the plain end portion of the adjacent section. The trunnion members 11ᵃ of the structure illustrated in Figs. 4 to 8, inclusive, are adapted to be arranged around the mold M' at longitudinally spaced points for cooperation with the sets of supporting and driving rollers 10. The members 11ᵃ may be substantially the same as the members 11 described above, each member 11ᵃ having an external flange 32 for reception by the grooves 18 of a set of rollers 10 and an internal groove 33 for receiving a pneumatic tube 12ᵃ. The members 11ᵃ are proportioned so that their internal diameters are greater than the largest external diameter of the upset end portions 31 of the mold sections 30 whereby the members 11ᵃ may be easily positioned on the mold M'.

The pneumatic tubes 12ᵃ may be substantially the same as the tubes 12 described above. The tubes 12ᵃ are annular flexible resilient tubes formed of rubber or the like. The tubes 12ᵃ are shaped and proportioned to fit the grooves 33 in the members 11ᵃ and the tubes are designed to be clear of the mold M' when deflated. The inner walls of the tubes 12ᵃ may be curved or concaved, as illustrated by the broken lines in Fig. 6 when the tubes are in their normal deflated condition. The tubes 12ᵃ are adapted to be freely passed over the upset end portions 30ᵃ of the mold sections 30 when in the deflated condition. The resiliency of the tubes 12ᵃ causes their inner walls to return to the concave condition to be entirely free of the mold M' when the tubes are deflated, thereby facilitating the easy removal of the members 11ᵃ from the mold M'. Each tube 12ᵃ has a valved stem 34 similar to the above described stems 22. The stems 34 project from the members 11ᵃ to facilitate the inflation and deflation of the tubes.

The construction illustrated in Figs. 4 to 8, inclusive, includes means on the trunnion members 11ᵃ for preventing the inflated pneumatic tubes 12ᵃ from bulging at the sides or ends of the wheels. As above described, the members 11ᵃ are proportioned to freely pass over the enlarged end portions 31 of the mold sections 30 and, therefore, have substantial clearance with the major portion of the mold M'. The inflated tubes 12ᵃ may have a tendency to bulge through these clearance spaces at the interiors of the members 11ᵃ. The means for preventing this bulging of the pneumatic tubes 12ᵃ includes retaining rings 35 adapted to be arranged against the opposite ends of the tubes 12ᵃ to occupy said clearance spaces. The rings 35 are split to each include two sections and hinges 36 connect the two sections of each ring 35. The retaining rings 35 are adapted to lie flat against the opposite ends of the tubes 12ᵃ and may substantially completely occupy the annular clearance spaces between the mold M' and the inner surfaces of the members 11ᵃ.

Means are provided for retaining the rings 35 in place at the ends of the tubes 12ᵃ. Pins 38 project from the opposite ends of the wheels 11ᵃ and have enlarged heads 39 at their outer ends. Outwardly projecting lugs 40 are provided on the retaining rings 35 and each lug 40 has a slot 41 for receiving a pin 38. It will be apparent how the hinged sectional rings 35 may be readily arranged about the mold M' and engaged against the ends of the tubes 12ᵃ. The rings 35 may be turned slightly to engage their lugs 40 with the pins 38. The rings 35 substantially occupy the clearance spaces at the interiors of the members 11ᵃ and dependably prevent bulging of the pneumatic tubes 12ᵃ at the ends of the wheels. The heads 39 of the pins 38 cooperate with the lugs 40 to prevent outward displacement of the rings 35 by the force exerted on the rings by the inflated tubes 12ᵃ.

The trunnion wheel and pneumatic tube assemblies illustrated in Figs. 4 to 8, inclusive, of the drawings are adapted to be employed in substantially the same manner as the members 11 and tubes 12 described above. The wheels 11ᵃ are adapted to be passed over the mold M' to positions for engagement with the rollers 10 with the tubes 12ᵃ in the deflated condition. When the members 11ᵃ have been arranged in the correct positions the rings 35 are engaged about the mold M' and locked in place at the ends of the members 11ᵃ to be in position to prevent bulging of the tubes 12ᵃ. The tubes 12ᵃ may then be inflated to secure the members 11ᵃ in place on the mold M'. The mold M' may be filled with the cementitious material and rotated in the usual manner. The pneumatic tubes 12ᵃ function in the same manner as the tubes 12 to centralize the mold M' and to absorb vibration and stresses. At the completion of the casting operation the mold M' is removed from the rollers 10 and may be rolled across the floor or yard on the members 11ᵃ to a position on or over a rack 42. The rack 42 is adapted to support the mold M' in a position where the members 11ᵃ are clear of the ground or floor. The tubes 12ᵃ may then be deflated to allow the mold M' to settle onto the rack 42, whereupon the members 11ᵃ may be disengaged from the mold M'. When the tubes 12ᵃ are deflated their inner walls move to a position such as shown by the broken lines in Fig. 6 to be entirely clear of the mold M' and to freely pass over the enlarged upset portions 31. Prior to the removal of the members 11ᵃ from the mold M' the retaining rings 35 are disengaged from the members 11ᵃ and removed from the mold M'.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. In apparatus for operating a centrifugal mold, an annular member to be arranged around the mold and adapted to pass the mold with substantial clearance, a pneumatic tube on the inner side of the member adapted to be inflated to contract about the mold and expand against the wheel to secure the member to the mold, and means attachable to the ends of the member for preventing the tube from bulging through the clearance between the member and mold, said means comprising a sectional ring for each end of the member.

2. In combination, a centrifugal mold having a portion of enlarged external diameter, an annular member adapted to be passed over said enlarged portion to a position surrounding the mold, a flexible resilient pneumatic tube on the inner side of the member adapted to be inflated to contract about the mold and form a cushion removably securing the member to the mold, rings for arrangement at the opposite ends of the member, and means for removably securing the rings to the member so that the rings prevent the tube from bulging through the clearance between the mold and wheel.

3. In combination, a centrifugal mold having a portion of enlarged external diameter, an annular member adapted to be passed over said enlarged portion to a position surrounding the mold, a flexible resilient pneumatic tube on the inner side of the member adapted to be inflated to contract about the mold and form a cushion removably securing the member to the mold, rings arranged at the opposite ends of the member for preventing the tube from bulging through the clearance between the mold and member, each ring including sections, and hinge means connecting the sections for ready arrangement around the mold and means for removably attaching the rings to the member.

4. In apparatus for operating a centrifugal mold, an annular member to be arranged around the mold, and a resilient pneumatic tube carried by the member inflatable to secure the wheel to the mold, the inner side of the tube being concave and formed to spring free of the mold when the tube is deflated.

5. Means for use with a centrifugal mold comprising a driving ring proportioned to be passed onto the mold with considerable clearance, an expansible resilient pneumatic tube on the inner side of the ring adapted when inflated to contract onto the mold to secure the ring to the mold, ring sections for arrangement at each end of the ring, the sections having axial flanges for occupying the clearance between the inner side of the ring and the mold to prevent the tube from bulging through the clearance space when the tube is inflated, and means for removably securing the sections to the ring.

6. In apparatus for operating a centrifugal mold, an annular member to be arranged around the mold and adapted to pass the mold with substantial clearance, a pneumatic tube on the inner side of the member adapted to be inflated to contract about the mold and expand against the wheel to secure the member to the mold, and means for occupying the clearance spaces between the mold and the member at each end of the tube to prevent the inflated tube from bulging from the member.

LUTHER M. BUSH.